(12) United States Patent
Neto et al.

(10) Patent No.: US 9,024,949 B2
(45) Date of Patent: May 5, 2015

(54) OBJECT REPRESENTATION USING DISTANCE FUNCTIONS

(75) Inventors: Murilo Gondim Neto, Los Angeles, CA (US); Sebastian Mark Marino, West Hollywood, CA (US)

(73) Assignees: Sony Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 2455 days.

(21) Appl. No.: 11/083,306

(22) Filed: Mar. 17, 2005

(65) Prior Publication Data

US 2006/0077203 A1    Apr. 13, 2006

Related U.S. Application Data

(60) Provisional application No. 60/618,212, filed on Oct. 13, 2004.

(51) Int. Cl.
*G06T 15/06* (2011.01)
*G06T 17/00* (2006.01)

(52) U.S. Cl.
CPC ............... *G06T 17/00* (2013.01); *G06T 15/06* (2013.01)

(58) Field of Classification Search
CPC ...................................................... G06T 15/06
USPC ................................................ 345/419, 426
See application file for complete search history.

(56) References Cited

U.S. PATENT DOCUMENTS

| | | | | |
|---|---|---|---|---|
| 4,630,203 A * | 12/1986 | Szirtes | ........................... | 382/132 |
| 5,136,660 A * | 8/1992 | Flickner et al. | ................ | 382/276 |
| 5,369,738 A * | 11/1994 | Bremner, III | ................. | 345/426 |
| 5,542,036 A * | 7/1996 | Schroeder et al. | ............ | 345/424 |
| 5,555,352 A * | 9/1996 | Lucas | ........................... | 345/423 |
| 5,566,282 A * | 10/1996 | Zuiderveld | ..................... | 345/424 |
| 5,570,460 A * | 10/1996 | Ramanujam | .................. | 345/424 |
| 5,588,098 A * | 12/1996 | Chen et al. | ..................... | 345/653 |
| 5,742,293 A * | 4/1998 | Koyamada et al. | ........... | 345/421 |
| 5,787,889 A * | 8/1998 | Edwards et al. | .............. | 600/443 |
| 5,808,609 A * | 9/1998 | Guha | ............................ | 715/848 |
| 5,933,146 A * | 8/1999 | Wrigley | ........................ | 345/420 |
| 5,936,628 A * | 8/1999 | Kitamura et al. | ............. | 345/420 |
| 6,023,523 A * | 2/2000 | Cohen et al. | .................. | 382/154 |
| 6,061,469 A * | 5/2000 | Walterman | ..................... | 382/154 |
| 6,072,497 A * | 6/2000 | Lichtenbelt et al. | .......... | 345/424 |

(Continued)

OTHER PUBLICATIONS

Foley, James D.; van Dam, Andries; Feiner, Steven k.; Hughes, John F.; "Computer Graphics Principles and Practice;" 1996, Addison-Wesley Publishing Company; Second Edition; pp. 701-707.*

(Continued)

*Primary Examiner* — Aaron M Richer
*Assistant Examiner* — Roberta D Prendergast
(74) *Attorney, Agent, or Firm* — Procopio, Cory, Hargreaves & Savitch LLP (57) ABSTRACT

An embodiment of the present invention includes a technique to represent three-dimensional (3-D) object using signed distance functions. A bounding box containing an object is constructed in a 3-D coordinate system. The bounding box has at least a bounding plane. A ray is projected from a grid point on the bounding plane to the object with a pre-defined direction. The ray intersects a surface of the object at an intersection point. A parameterization value of the intersection point associated with the grid point is computed. The parameterization value corresponds to a distance from the grid point to the intersection point.

48 Claims, 6 Drawing Sheets

(56) References Cited

U.S. PATENT DOCUMENTS

| | | | | |
|---|---|---|---|---|
| 6,115,047 | A * | 9/2000 | Deering | 345/422 |
| 6,131,106 | A * | 10/2000 | Steele, Jr. | 708/510 |
| 6,313,841 | B1 * | 11/2001 | Ogata et al. | 345/424 |
| 6,353,677 | B1 * | 3/2002 | Pfister et al. | 382/154 |
| 6,396,492 | B1 * | 5/2002 | Frisken et al. | 345/420 |
| 6,501,471 | B1 * | 12/2002 | Venkataraman et al. | 345/424 |
| 6,509,902 | B1 * | 1/2003 | Pfister et al. | 345/582 |
| 6,510,244 | B2 * | 1/2003 | Proesmans et al. | 382/203 |
| 6,525,729 | B1 * | 2/2003 | Akerman et al. | 345/426 |
| 6,580,425 | B1 * | 6/2003 | Zwicker et al. | 345/420 |
| 6,583,787 | B1 * | 6/2003 | Pfister et al. | 345/441 |
| 6,593,925 | B1 * | 7/2003 | Hakura et al. | 345/426 |
| 6,603,484 | B1 * | 8/2003 | Frisken et al. | 345/622 |
| 6,862,025 | B2 * | 3/2005 | Buehler | 345/424 |
| 6,952,204 | B2 * | 10/2005 | Baumberg et al. | 345/420 |
| 7,023,438 | B2 * | 4/2006 | Lokovic et al. | 345/426 |
| 7,098,907 | B2 * | 8/2006 | Houston et al. | 345/419 |
| 7,133,041 | B2 * | 11/2006 | Kaufman et al. | 345/419 |
| 7,343,039 | B2 * | 3/2008 | Liu et al. | 382/170 |
| 7,348,977 | B2 * | 3/2008 | West et al. | 345/426 |
| 2002/0113787 | A1 * | 8/2002 | Ray et al. | 345/424 |
| 2002/0118188 | A1 * | 8/2002 | Zviaguina et al. | 345/421 |
| 2002/0186216 | A1 * | 12/2002 | Baumberg et al. | 345/422 |
| 2003/0076319 | A1 * | 4/2003 | Hiraga | 345/420 |
| 2003/0112281 | A1 * | 6/2003 | Sriram et al. | 345/958 |
| 2003/0214502 | A1 * | 11/2003 | Park et al. | 345/420 |
| 2004/0032978 | A1 * | 2/2004 | Hsieh | 382/131 |
| 2004/0091084 | A1 * | 5/2004 | Griffith | 378/210 |
| 2004/0108999 | A1 * | 6/2004 | Martin | 345/423 |
| 2004/0170302 | A1 * | 9/2004 | Museth et al. | 382/107 |
| 2005/0062762 | A1 * | 3/2005 | Wang et al. | 345/643 |
| 2005/0074155 | A1 * | 4/2005 | Alyassin | 382/131 |
| 2005/0128195 | A1 * | 6/2005 | Houston et al. | 345/419 |
| 2005/0134606 | A1 * | 6/2005 | Hong et al. | 345/619 |
| 2005/0231530 | A1 * | 10/2005 | Liang et al. | 345/619 |
| 2006/0077203 | A1 * | 4/2006 | Neto et al. | 345/419 |
| 2007/0201737 | A1 * | 8/2007 | Cai | 382/131 |
| 2007/0262989 | A1 * | 11/2007 | Buyanovskiy | 345/426 |
| 2007/0274604 | A1 * | 11/2007 | Schechner et al. | 382/254 |

OTHER PUBLICATIONS

Foley, James D.; van Dam, Andries; Feiner, Steven k.; Hughes, John F.; "Computer Graphics Principles and Practice;" 1996, Addison-Wesley Publishing Company; Second Edition; pp. 1-22, 213-215, 229-260, 660 and 701-712.*

Pires, Pedro, "Dynamic Algorithm Binding for Virtual Walkthroughs", Instituto Superior Technico—Technical University of Lisbon, Nov. 2001, 107 pages, downloaded from: http://scholar.google.com/scholar?cluster=12671398101957443286&hl=en&as_sdt=80000000000000.*

Carr, et al., "The ray engine", Proceedings of the ACM SIGGRAPH/EUROGRAPHICS Conference on Graphics Hardware, Saarbrucken, Germany, Sep. 1-2, 2002, Eurographics Association, Aire-la-Ville, Switzerland, pp. 37-46.*

Hart, J., 1997, "Sphere tracing: A geometric method for the antialiased ray tracing of implicit surfaces", The Visual Computer, vol. 12, Issue 10, pp. 527-545.*

D. Jevans and B. Wyvill, "Adaptive voxel subdivision for ray tracing", Proceedings of the Conference on Graphics Interface '89, pp. 164-172, Jun. 1989.*

Kalra, D. and Barr, A. H., Jul. 1989, "Guaranteed ray intersections with implicit surfaces", Proceedings of the 16th Annual Conference on Computer Graphics and interactive Techniques, SIGGRAPH'89, ACM, New York, NY, pp. 297-306.*

Pfister, et al., Aug. 1999, "The VolumePro real-time ray-casting system", Proceedings of the 26th Annual Conference on Computer Graphics and interactive Techniques International, ACM Press/Addison-Wesley Publishing Co., New York, NY, pp. 251-260.*

Pfister, et al., Jul. 2000, "Surfels: surface elements as rendering primitives", Proceedings of the 27th Annual Conference on Computer Graphics and interactive Techniques, ACM Press/Addison-Wesley Publishing Co., New York, NY, pp. 335-342.*

Wan, et al., "High Performance Presence-Accelerated Ray Casting", Proceedings of the 10th IEEE Conference Visualization 1999 (VIS '99), Oct. 25-28, 1999, Visualization, IEEE Computer Society, Washington, DC, pp. 379-387.*

Wu, et al., "Shear-image order ray casting vol. rendering", Proceedings of the 2003 Symposium on interactive 3D Graphics, Monterey, California, Apr. 27-30, 2003, I3D '03, ACM, New York, NY, pp. 152-162.*

James Arvo and David Kirk, 1987, "Fast ray tracing by ray classification", SIGGRAPH Computer Graphics, vol. 21, Issue 4, Jul. 1987, pp. 55-64.*

A. Leu and M. Chen, "Modelling and rendering graphics scenes composed of multiple volumetric datasets", Computer Graphics Forum, vol. 18(2), pp. 159-171, Jun. 1999.*

* cited by examiner

OBJECT REPRESENTATION USING DISTANCE FUNCTIONS

RELATED APPLICATION

This application claims the benefit of the provisional application filed on Oct. 13, 2004, titled "Interval-based implicit representation of signed distance functions", Ser. No. 60/618,212, assigned to the same assignee of this application.

BACKGROUND

1. Field of the Invention

Embodiments of the invention relates to the field of graphics and imaging, and more specifically, to object representation.

2. Description of Related Art

Representation of three-dimensional (3-D) objects has a number of applications such as graphics, image processing, solid modeling, and computational geometry, etc. Due to the complexity of 3-D objects, it is important that the representation be efficient to allow fast processing or reduced storage requirements.

Existing techniques to represent graphical or image objects have a number of drawbacks. Most existing techniques represent object data in terms of their coordinates with respect to a coordinate system. For three-dimensional objects, the representation requires values of the coordinates for each data point on the object to be computed and stored. This representation scheme requires a large amount of storage and computational efforts. Other techniques utilize a hierarchical scheme where the object is represented at several levels of hierarchy (e.g., resolution) using reduced representation such as octree. These techniques require complex data structures or computation efforts to traverse the trees through the hierarchy.

BRIEF SUMMARY OF INVENTION

An embodiment of the present invention includes a technique to represent three-dimensional (3-D) object using signed distance functions. A bounding box containing an object is constructed in a 3-D coordinate system. The bounding box has at least a bounding plane. A ray is projected from a grid point on the bounding plane to the object with a predefined direction. The ray intersects a surface of the object at an intersection point. A parameterization value of the intersection point associated with the grid point is computed. The parameterization value corresponds to a distance from the grid point to the intersection point.

BRIEF DESCRIPTION OF THE DRAWINGS

Embodiments of the invention may best be understood by referring to the following description and accompanying drawings that are used to illustrate embodiments of the invention. In the drawings.

DESCRIPTION

An embodiment of the present invention includes a technique to represent three-dimensional (3-D) object using signed distance functions. A bounding box containing an object is constructed in a 3-D coordinate system. The bounding box has at least a bounding plane. A ray is projected from a grid point on the bounding plane to the object with a predefined direction. The ray intersects a surface of the object at an intersection point. A parameterization value of the intersection point associated with the grid point is computed. The parameterization value corresponds to a distance from the grid point to the intersection point.

In the following description, numerous specific details are set forth. However, it is understood that embodiments of the invention may be practiced without these specific details. In other instances, well-known circuits, structures, and techniques have not been shown in order not to obscure the understanding of this description.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc.

Embodiments of the invention provide efficient techniques to represent 3-D objects. The techniques may be used in many useful and practical applications such as graphics, animation, image processing, computational geometry, solid modeling, computer-aided design (CAD), medical imaging, graphical rendition, mechanical modeling, biological structural analysis, etc. An embodiment of the invention provides a number of advantages: (1) lossless representation: The process to represent the 3-D object has no loss of information. The accuracy and completeness of the representation depends mainly on the resolutions of the sample points; (2) efficient storage requirements: The amount of storage is much less than prior art techniques. Typically, the storage requirement is in the order of the plane (e.g., surface) storage requirement, not volume storage requirement; and (3) efficient computations. The computational process is fast due to efficient representations. Simple operations such as interpolation and addition are used.

Figure 1:
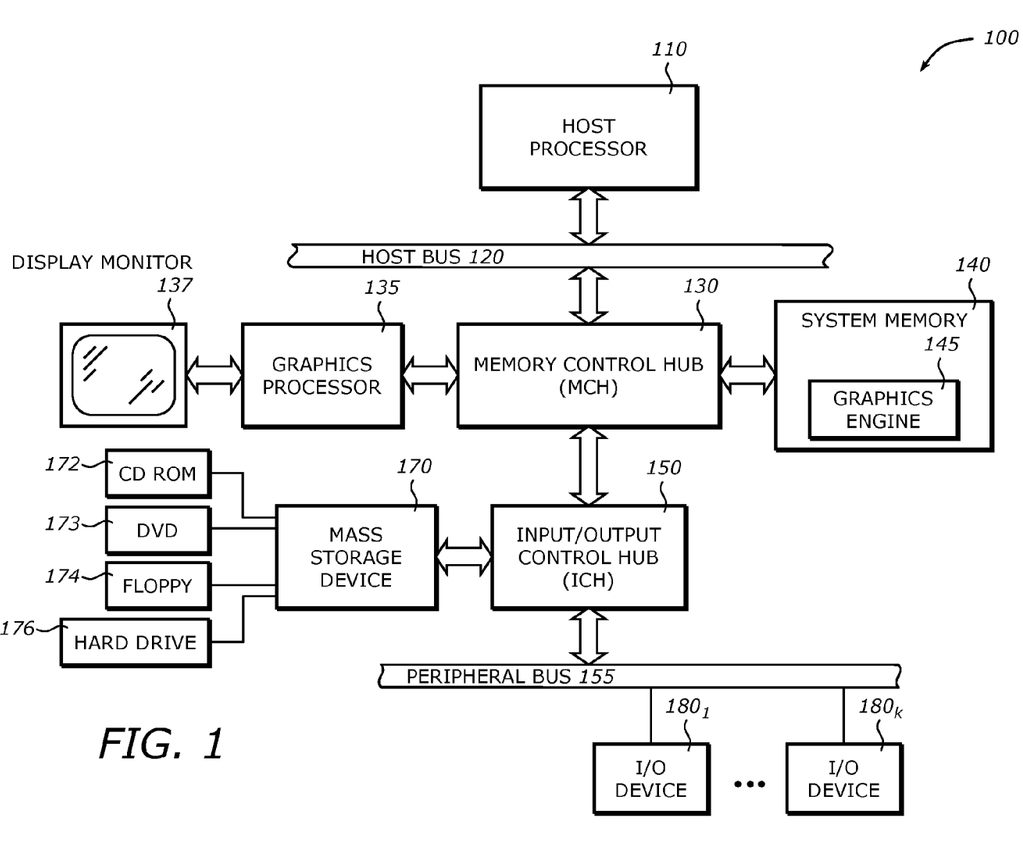
FIG. 1 is a diagram illustrating a system in which one embodiment of the invention can be practiced.

FIG. 1 is a diagram illustrating a system 100 in which one embodiment of the invention can be practiced. The system 100 includes a host processor 110, a host bus 120, a memory control hub (MCH) 130, a graphics processor 135, a display monitor 137, a system memory 140, an input/output control hub (ICH) 150, a peripheral bus 155, a mass storage device 170, and input/output devices $180_1$ to $180_K$. Note that the system 100 may include more or less elements than these elements.

The host processor 110 represents a central processing unit of any type of architecture, such as embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The host bus 120 provides interface signals to allow the processor 110 to communicate with other processors or devices (e.g., the MCH 130, the graphics processor 135). The host bus 120 may support a uni-processor or multiprocessor configuration. The host bus 120 may be parallel, sequential, pipelined, asynchronous, synchronous, or any combination thereof.

The MCH 130 provides control and configuration of memory and input/output devices such as the system memory 140 and the ICH 150. The MCH 130 may be integrated into a chipset that integrates multiple functionalities such as graphics host-to-peripheral bus interface, memory control. The MCH 130 interfaces to the peripheral bus 155. For clarity, not all the peripheral buses are shown. It is contemplated that the system 100 may also include peripheral buses such as Peripheral Component Interconnect (PCI), accelerated graphics port (AGP), Industry Standard Architecture (ISA) bus, and Universal Serial Bus (USB), etc.

The graphics processor 135 is any processor that provides graphics functionalities. The graphics processor 135 may also be integrated into the MCH 130 to form a Graphics and Memory Controller Hub (GMCH). The graphics processor 135 may be a graphics card such as the Graphics Performance Accelerator (AGP) card, interfaced to the MCH 130 via a graphics port such as the Accelerated Graphics Port (AGP) controller. The graphics processor 135 provides interface to the display monitor 137 such as standard progressive scan monitor, television (TV)-out device, and Transition Minimized Differential Signaling (TMDS) controller. The display monitor 137 may be any display device such as Cathode Ray Tube (CRT) monitor, TV set, Liquid Crystal Display (LCD), Flat Panel, and Digital CRT.

The system memory 140 stores system code and data. The system memory 140 is typically implemented with dynamic random access memory (DRAM) or static random access memory (SRAM). The system memory may include program code or code segments implementing one embodiment of the invention. The system memory includes a graphics engine module 145. Any one of the elements of the graphics engine module 145 may be implemented by hardware, software, firmware, microcode, or any combination thereof. The system memory 140 may also include other programs or data which are not shown, such as an operating system. The graphics engine module 145 may also contain code or instructions that can be executed by the host processor 110 or the graphics processor 135.

The ICH 150 has a number of functionalities that are designed to support I/O functions. The ICH 150 may also be integrated into a chipset together or separate from the MCH 130 to perform I/O functions. The ICH 150 may include a number of interface and I/O functions such as PCI bus interface to interface to the peripheral bus 155, processor interface, interrupt controller, direct memory access (DMA) controller, power management logic, timer, system management bus (SMBus), universal serial bus (USB) interface, mass storage interface, low pin count (LPC) interface, etc.

The mass storage device 170 stores archive information such as code, programs, files, data, applications, and operating systems. The mass storage device 170 may include compact disk (CD) ROM 172, a digital video/versatile disc (DVD) 173, floppy drive 174, and hard drive 176, and any other magnetic or optic storage devices. The mass storage device 170 provides a mechanism to read machine-accessible media. The machine-accessible media may contain computer readable program code to perform tasks as described in the following.

The I/O devices $180_1$ to $180_K$ may include any I/O devices to perform I/O functions. Examples of I/O devices $180_1$ to $180_K$ include controller for input devices (e.g., keyboard, mouse, trackball, pointing device), media card (e.g., audio, video, graphics), network card, and any other peripheral controllers.

Figure 2:
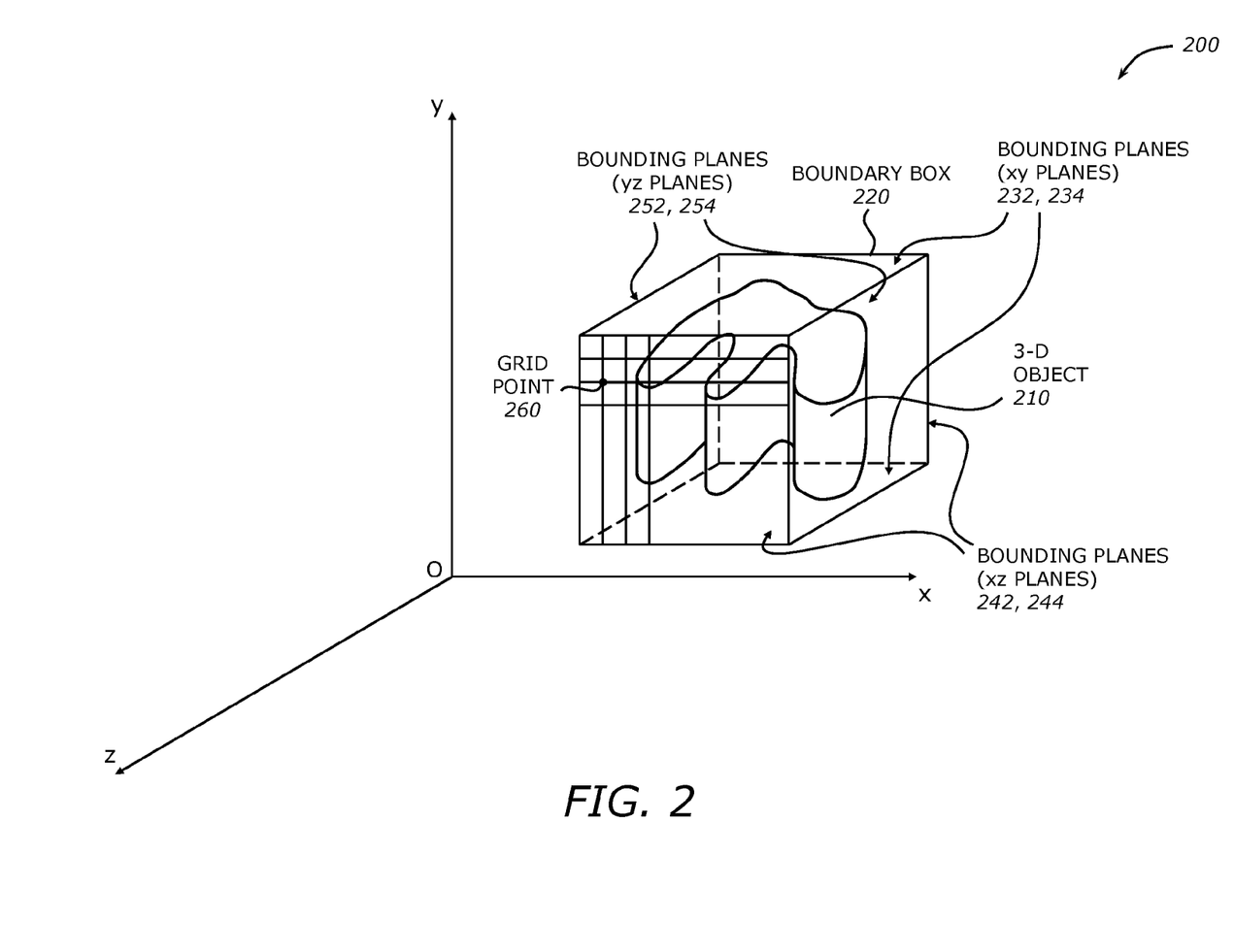
FIG. 2 is a diagram illustrating a coordinate system according to one embodiment of the invention.

FIG. 2 is a diagram illustrating a coordinate system according to one embodiment of the invention. The coordinate system 200 includes an origin O, and x, y, and z axes, a three-dimensional (3-D) object 210, and a bounding box 220. As is known by one skilled in the art, other coordinate systems may be employed. These include, but are not limited to, the cylindrical and spherical coordinate systems. In the cylindrical coordinate system, the coordinates of a point P are the coordinate z of the projection of P on the axis. In the spherical coordinate system, the position of a point P is given by the intersection of a plane surface θ=constant, a conical surface φ=constant, and a spherical surface ρ=constant.

The x, y, and z axes form the traditional Cartesian coordinate system for graphics rendering and image visualization. The 3-D object 210 may be any 3-D object to be represented efficiently using an interval-based implicit representation of signed distance functions. For example, it may be an industrial object, a building, a manifold, a medical structure, a biological organ, an airplane, etc. The object 210 may be complex or simple. It may be convex or non-convex and is typically formed by multiple surfaces.

The bounding box 220 is a structure that surrounds or contains the object 210. It is typically a box with rectangular sides or a cube. It is defined by the bounding planes: xy planes 232 and 234, xz planes 242 and 244, and yz planes 252 and 254. The xy planes 232 and 234, xz planes 242 and 244, and yz planes 252 and 254 are parallel or aligned to the planes xOy, xOz, and yOz of the (x,y,z) coordinate system. Using planes that are parallel or aligned with the coordinate planes provides an advantage in that the coordinates of the grid points on the planes have one implicit known dimension. For example, grid points (e.g., 260) on the xy plane all have the z coordinate, on the yz plane all have the same x coordinate, and on the zx plane have the same y coordinate. The bounding planes for other coordinate systems may be similarly defined.

Each of the bounding planes xy planes 232 and 234, xz planes 242 and 244, and yz planes 252 and 254 has grid points. The locations of these grid points depend on the resolutions of the corresponding planes. In one embodiment, a principal resolution is determined for a principal axis based on the largest side of the xy planes 232 and 234, xz planes 242 and 244, and yz planes 252 and 254. The remaining resolutions of the remaining axes are then determined according to the principal resolution. For example, if the largest side of the xy planes 232 and 234, xz planes 242 and 244, and yz planes 252 and 254 lies in the y axis, then the principal resolution is determined for this axis. The principal resolution may be determined as the number of divisions or pixels lying along the y axis. From this principal resolution, the remaining resolutions are then determined.

In one embodiment, the bounding box 220 may have any suitable volumetric shape that can be represented parametrically. For example, it may be a cylinder, a sphere, an ellipsoid, or any other analytical geometric shape. When these shapes are represented parametrically, the construction of the bounding box can be easily performed. For example, the sphere may be represented as $(x-x_0)^2+(y-y_0)^2+(z-z_0)^2=R^2$ where $(x_0, y_0,$ $z_0$) are the coordinates of the center of the sphere and R is its radius. For other coordinate systems, the bounding box may be similarly represented.

Figure 3:
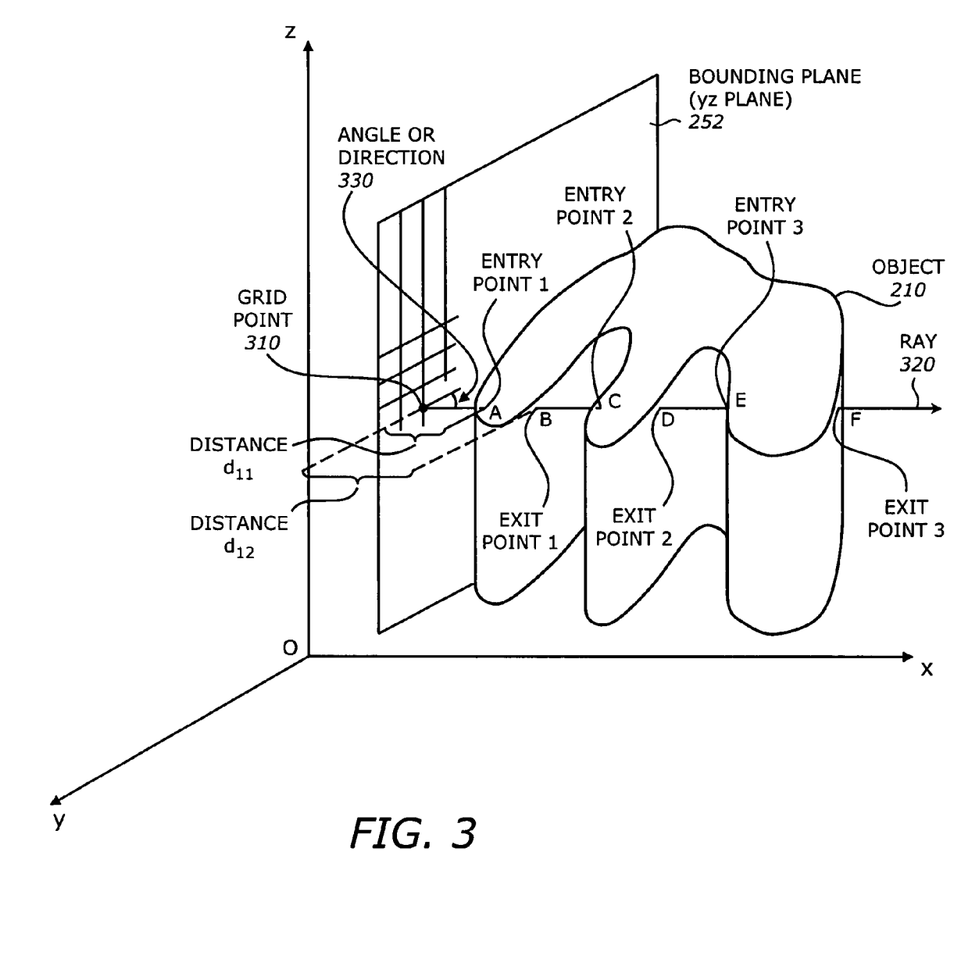
FIG. 3 is a diagram illustrating representation using signed distance function according to one embodiment of the invention.

FIG. 3 is a diagram illustrating representation using signed distance function according to one embodiment of the invention.

The object 210 may have any shape. It may be non-convex having multiple curved surfaces. The surfaces may be hidden as viewed from a particular viewpoint. The object 210 is represented by the object points located on the object 210. The representation is parameterized with respect to the xy planes 232 and 234, xz planes 242 and 244, and yz planes 252 and 254 of the bounding box 220. It is not necessary to use all of these planes to obtain the representation for the object 210. For example, the object 210 may be partially represented by only N planes where N is less than 6. If the shape of the object 210 or some a priori knowledge of the object 210 is known, it is possible to use one, two, three, four, or five planes. For example, if it is known that the object 210 is symmetrical and the axis of symmetry is parallel with one of the planes of the bounding box 220, then it may be sufficient to use three planes.

An object point on the object 210 may be represented a distance from itself to a grid point on one of the xy planes 232 and 234, xz planes 242 and 244, and yz planes 252 and 254 of the bounding box 220. This can be accomplished as follows. First, a plane is selected from these planes. Then, a grid point on this plane is selected. A ray, or a vector, is then projected from this grid point to the object at a direction. This direction is typically known or determined in advance and may be expressed as the angle formed by the ray with respect to a known reference line. This ray intersects the object 210 at an intersection point. The distance between this intersection point and the corresponding grid point is then computed. The distance represents an interval from the grid point to the object point at a direction. The object point, or the intersection point, is represented as this distance and the pre-determined direction, or angle. When N grid points on a plane are used in the same manner, N object points are obtained. The process may be repeated for as many as remaining planes as necessary to obtain the completer representation of the object 210.

In the example shown in FIG. 3, suppose the yz plane 252 is selected. Then, the grid point 310 (point G) is selected. From this grid point, a ray or vector 320 is projected onto the object 210 at the direction 330. The ray 320 intersects the object 210 at an intersection point A. The distance $d_{11}$ between the intersection point A and the grid point 310 is computed. The intersection point A is then represented as the distance $d_{11}$. The direction a may also be used in the representation of the intersection point A.

Since the object 210 may have any shape and may be non-convex, the ray or vector 320 may intersect the object 210 at multiple surfaces, resulting in multiple intersection points. For example, it may intersect the surfaces of the object 210 at intersection points B, C, D, E, and F, in addition to the intersection point A. The distances from the grid point 210 to these intersection points (e.g., distance $d_{12}$ from grid point 310 to point B) may be computed and may be used as the representation of these intersection points. The multiple intersection points lie in the same ray. Therefore, a distance of a point $x_k$ may be computed as the sum of the distance of the previous point $x_{k-1}$ and the travel length of the ray between $x_{k-1}$ and $x_k$. For example, the distance GC is the sum of the distance GB and the length BC. Accordingly, the value BC may be recorded or saved to reduce storage requirement.

An intersection point may be an entry point or an exit point. It is an entry point if it is the intersection point when the ray 320 enters the object 210. It is an exit point if it is the intersection point when the ray 320 leaves the object 210.

When sufficient number of grid points are used, a sufficient number of parameterization values are obtained. These parameterization values correspond to the distances obtained as above. Since only the xy planes 232 and 234, xz planes 242 and 244, and yz planes 252 and 254 are used to obtain these parameterization values, the computational effort is in the order of (xy+xz+yz) which is significantly less than (x*y*z) as in the prior art techniques.

The distance may be negative or positive depending on the relative position of the object 210 with respect to the associated plane. It is positive when the object 210 lies on one side of the plane and is negative when the object 210 lies on the other side of the plane. The determination of which side to correspond to positive values and which side to correspond to negative values may be arbitrary, as long as the rule is consistent throughout the process. For example, when the yz plane 252 is used, the object 210 lies on the right side of the yz plane 252. The distances obtained using the yz plane 252 may be determined to be positive. When the yz plane 254 is used, the object 210 lies on the left side of the plane 254 and all the distances obtained using the yz plane 254 are determined to be negative. Similarly, the distances obtained using the xz plane 242 may be positive because the object 210 lies below the plane 242, and the distances obtained using the xz plane 244 may be negative because the object 210 lies above the plane 244.

Figure 4:
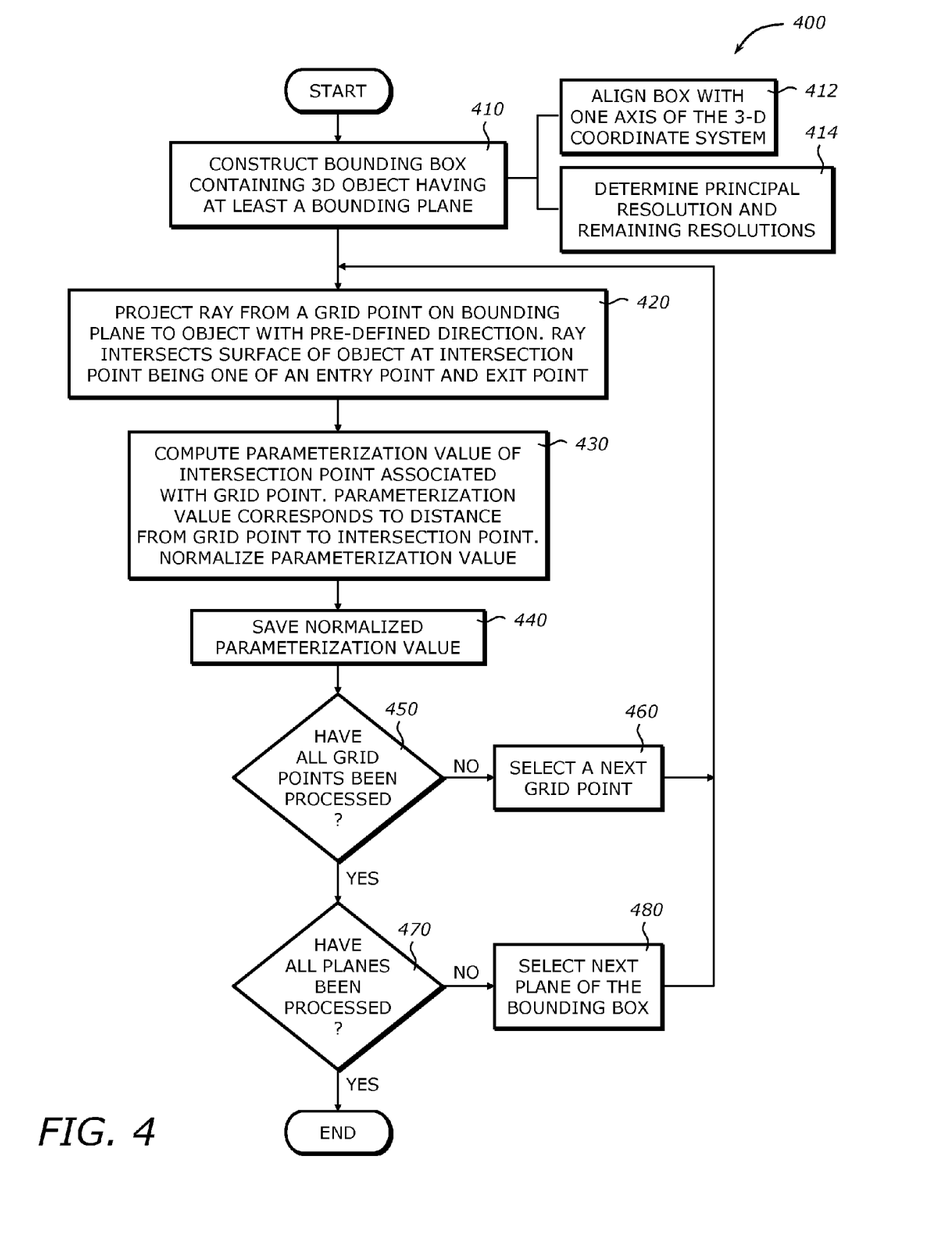
FIG. 4 is a flowchart illustrating a process to represent a 3-D object according to one embodiment of the invention.

FIG. 4 is a flowchart illustrating a process 400 to represent a 3-D object according to one embodiment of the invention.

Upon START, the process 400 constructs a bounding box that contains the 3-D object in a 3-D coordinate system (Block 410). This may include aligning box with one axis of the 3-D coordinate system (Block 412) and determining principal resolution and remaining resolutions (Block 414). The bounding box has at least a bounding plane. Then, the process 400 projects a ray from a grid point on one of the at least bounding planes to the object with a pre-defined direction (Block 420). The pre-defined direction may be determined as an angle formed by the ray with a reference line on the corresponding plane. The ray intersects the object at an intersection point. The intersection point may be an entry point or an exit point.

Next, the process 400 computes a parameterization value of the intersection point associated with the grid point (Block 430). The parameterization value corresponds to the distance from the grid point to the intersection point. The parameterization value is then normalized with respect to a reference value. The reference value may be selected according to some criteria. For example, it may be the largest distance, the average distance, or some appropriate value.

Then, the process 400 saves the normalized parameterization value as the representation of the intersection point in a memory or storage (Block 440). Next, the process 400 determines if all the grid points on the selected plane have been processed (Block 450). If not, the process selects a next grid point on the plane (Block 460) and goes back to block 420. Otherwise, the process 400 determines if all planes have been processed (Block 470). If not, the process 400 selects a next plane of the bounding box and an initial grid point on this plane (Block 480) and returns to Block 420. Otherwise, the process 400 is terminated.

The parameterization values therefore include the characterization of the object points of the object. This characterization includes the plane designation, the direction used to project the ray from this plane, and the distance values. The representation of the object may be used to reconstruct the object for 3-D rendition by a reconstruction process.

Figure 5A:
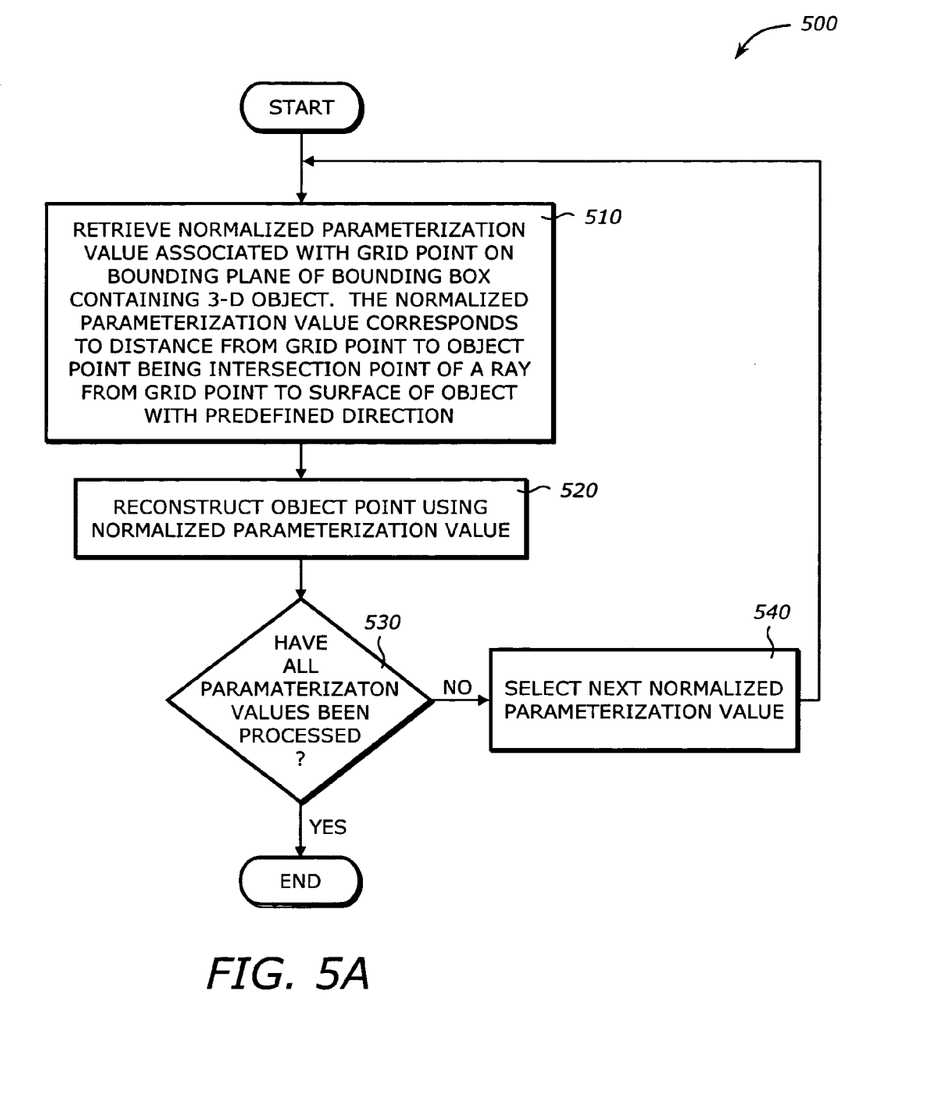
FIG. 5A is a flowchart illustrating a process to reconstruct a 3-D object according to one embodiment of the invention.

FIG. 5A is a flowchart illustrating a process 500 to reconstruct a 3-D object according to one embodiment of the invention.

Upon START, the process 500 retrieves a normalized parameterization value from a memory (Block 510). The normalized parameterized value is associated with a grid point on one of the bounding planes of a bounding box that contains the 3-D object in a 3-D coordinate system. The normalized parameterized value corresponds to a distance from the grid point to the objects point on the object. The object point is the intersection point of a ray projected from the grid point to a surface of the object with a pre-defined direction.

Then, the process 500 reconstructs the object point using the normalized parameterization value (Block 520). Next, the process 500 determines all the parameterization values have been processed (Block 530). If not, the process 500 selects a next normalized parameterization value (Block 540) and goes to block 510. Otherwise, the process 500 is terminated.

Figure 5B:
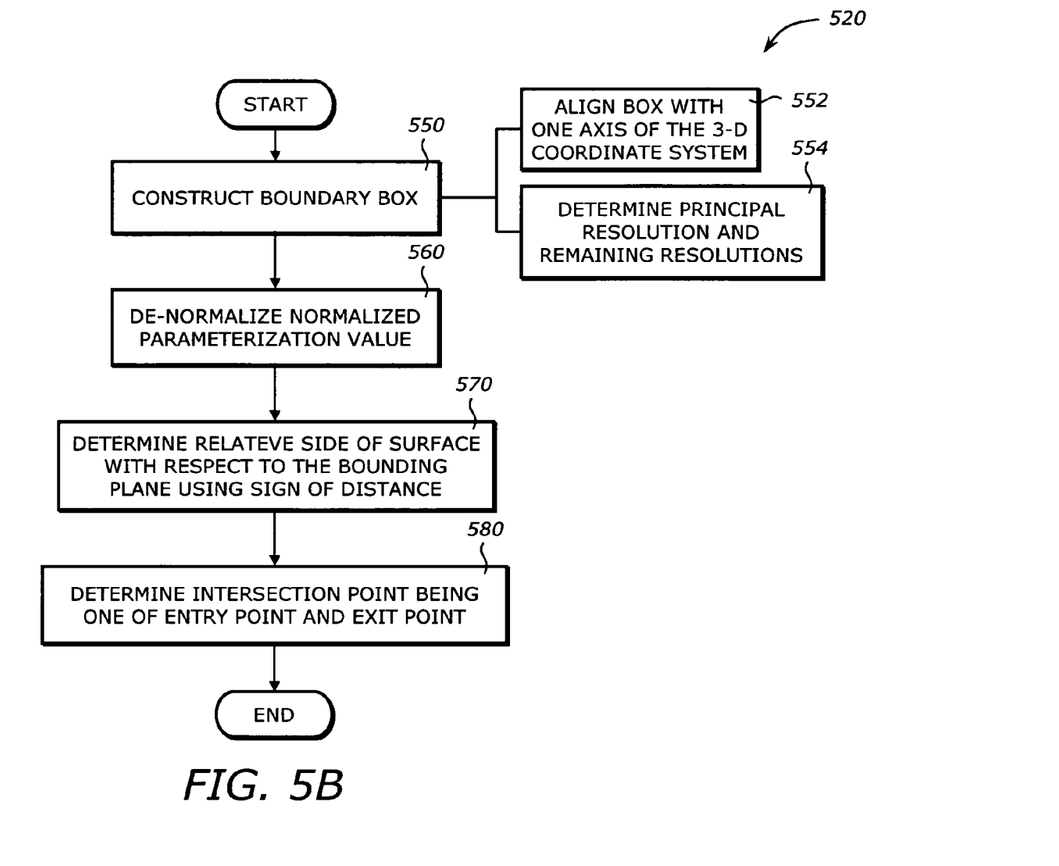
FIG. 5B is a flowchart illustrating a process to reconstruct a an object point according to one embodiment of the invention.

FIG. 5B is a flowchart illustrating a process 520 to reconstruct a an object point according to one embodiment of the invention.

Upon START, the process 520 constructs a bounding box that contains the 3-D object (Block 550). This is done only the first time at the start of the reconstruction. To do this, the process 520 aligns the bounding box with one axis of the 3-D coordinate system (Block 552). Then, the process 520 determines the principal resolution of the axis corresponding to the largest side of the bounding box and then the remaining resolutions of the remaining axes (Block 554).

After the bounding box is constructed, the process 520 de-normalizes the normalized parameterization value using the designated reference value (Block 560). Next, the process 520 determines the relative side of the surface with respect to the bounding plane using the sign of the distance (Block 570). Then, the process 520 determines the intersection point using the distance value given in the parameterization value (Block 580). The intersection point may be an entry point or an exit point. The process 520 is then terminated.

Elements of one embodiment of the invention may be implemented by hardware, firmware, software or any combination thereof. The term hardware generally refers to an element having a physical structure such as electronic, electromagnetic, optical, electro-optical, mechanical, electromechanical parts, etc. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory, ROM, EPROM). Examples of firmware may include microcode, writable control store, micro-programmed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable programmable ROM (EPROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described above. The machine accessible medium may also include program code embedded therein. The program code may include machine readable code to perform the operations described above. The term "data" here refers to any type of information that is encoded for machine-readable purposes. Therefore, it may include program, code, data, file, etc.

All or part of an embodiment of the invention may be implemented by hardware, software, or firmware, or any combination thereof. The hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A system comprising:

a processor;

a memory coupled to the processor to contain instructions, when executed by the processor, that perform operations comprising:

constructing a bounding box having a volumetric shape and containing a three-dimensional (3-D) object in a 3-D coordinate system, the bounding box having at least a bounding plane having a grid point;

projecting a ray from the grid point on the bounding plane to the object with a pre-defined direction, the ray intersecting a surface of the object at an intersection point; and computing a parameterization value of the intersection point associated with the grid point, the parameterization value corresponding to a distance from the grid point to the intersection point.

2. The system of claim 1 wherein the instructions causing the processor to perform constructing comprises instructions that, when accessed by the processor, causes the processor to perform operations comprising:
aligning the bounding box with at least one axis of the 3-D coordinate system.

3. The system of claim 2 wherein the instructions causing the processor to perform constructing further comprises instructions that, when accessed by the processor, causes the processor to perform operations comprising:
determining principal resolution of a principal axis of the bounding box, the principal axis corresponding to a largest side of the bounding box; and
determining remaining resolutions of remaining axes according to the principal resolution.

4. The system of claim 1 wherein the instructions causing the processor to perform projecting comprises instructions that, when accessed by the processor, causes the processor to perform operations comprising:
projecting the ray to the object at the intersection point being one of an entry point and an exit point.

5. The system of claim 4 wherein the instructions causing the processor to perform computing comprises instructions that, when accessed by the processor, causes the processor to perform operations comprising:
computing one of an entry value and an exit value corresponding to one of distances from the grid point to the entry point and the exit point, respectively.

6. The system of claim 4 wherein the instructions causing the processor to perform computing comprises instructions that, when accessed by the processor, causes the processor to perform operations comprising:
computing the distance being a positive value when the surface lies on a first side of the bounding plane and a negative value when the surface lies on a second side of the bounding plane.

7. The system of claim 1 wherein the instructions causing the processor to perform computing comprises instructions that, when accessed by the processor, causes the processor to perform operations comprising:
normalizing the parameterization value with respect to a reference value.

8. The system of claim 1 wherein the instructions causing the processor to perform projecting comprises instructions that, when accessed by the processor, causes the processor to perform operations comprising:
projecting the ray to the object intersecting multiple surfaces of the object at multiple intersecting points.

9. The system of claim 7 the instructions further comprises instructions that, when accessed by the processor, causes the processor to perform operations comprising:
saving the normalized parameterization value.

10. A system comprising:
a processor;
a memory coupled to the processor to contain instructions, when executed by the processor, that perform operations comprising:
retrieving a normalized parameterization value associated with a grid point on a bounding plane of a bounding box having a volumetric shape and containing a three-dimensional (3-D) object in a 3-D coordinate system, the normalized parameterization value corresponding to a distance from the grid point to an object point of the object, the object point being an intersection point between a ray projected from the grid point to a surface of the object with a pre-defined direction; and
reconstructing an object point of the object using the normalized parameterization value.

11. The system of claim 10 wherein the instructions causing the processor to perform reconstructing comprises instructions that, when accessed by the processor, causes the processor to perform operations comprising:
constructing the bounding box.

12. The system of claim 11 wherein the instructions causing the processor to perform constructing the bounding box comprises instructions that, when accessed by the processor, causes the processor to perform operations comprising:
aligning the bounding box with at least one axis of the 3-D coordinate system.

13. The system of claim 12 wherein the instructions causing the processor to perform constructing further comprises instructions that, when accessed by the processor, causes the processor to perform operations comprising:
determining principal resolution of a principal axis of the bounding box, the principal axis corresponding to a largest side of the bounding box; and
determining remaining resolutions of remaining axes according to the principal resolution.

14. The system of claim 10 wherein the instructions causing the processor to perform reconstructing comprises instructions that, when accessed by the processor, causes the processor to perform operations comprising:
de-normalizing the normalized parameterization value using a reference value.

15. The system of claim 10 wherein the instructions causing the processor to perform reconstructing comprises instructions that, when accessed by the processor, causes the processor to perform operations comprising:
determining the intersection point being one of an entry point and an exit point.

16. The system of claim 10 wherein the instructions causing the processor to perform reconstructing comprises instructions that, when accessed by the processor, causes the processor to perform operations comprising:
determining a relative side of the surface with respect to the bounding plane using a sign of the distance.

17. A computerized method comprising:
constructing a bounding box having a volumetric shape and containing a three-dimensional (3-D) object in a 3-D coordinate system, the bounding box having at least a bounding plane;
projecting a ray from a grid point on the bounding plane to the object with a pre-defined direction, the ray intersecting a surface of the object at an intersection point; and
computing a parameterization value of the intersection point associated with the grid point, the parameterization value corresponding to a distance from the grid point to the intersection point.

18. The method of claim 17 wherein constructing comprises
aligning the bounding box with at least one axis of the 3-D coordinate system.

19. The method of claim 18 wherein constructing further comprises:
determining principal resolution of a principal axis of the bounding box, the principal axis corresponding to a largest side of the bounding box; and
determining remaining resolutions of remaining axes according to the principal resolution.

20. The method of claim 17 wherein projecting comprises:
projecting the ray to the object at the intersection point being one of an entry point and an exit point.

21. The method of claim 20 wherein computing comprises:
computing one of an entry value and an exit value corresponding to one of distances from the grid point to the entry point and the exit point, respectively.

22. The method of claim 20 wherein computing comprises:
computing the distance being a positive value when the surface lies on a first side of the bounding plane and a negative value when the surface lies on a second side of the bounding plane.

23. The method of claim 17 wherein computing comprises:
normalizing the parameterization value with respect to a reference value.

24. The method of claim 17 wherein projecting comprises:
projecting the ray to the object intersecting multiple surfaces of the object at multiple intersecting points.

25. The method of claim 23 further comprising:
saving the normalized parameterization value.

26. A computerized method comprising:
retrieving a normalized parameterization value associated with a grid point on a bounding plane of a bounding box having a volumetric shape and containing a three-dimensional (3-D) object in a 3-D coordinate system, the normalized parameterization value corresponding to a distance from the grid point to an object point of the object, the object point being an intersection point of a ray projected from the grid point to a surface of the object with a pre-defined direction; and
reconstructing an object point of the object using the normalized parameterization value.

27. The method of claim 26 wherein reconstructing comprises
constructing the bounding box.

28. The method of claim 27 wherein constructing the bounding box comprises
aligning the bounding box with at least one axis of the 3-D coordinate system.

29. The method of claim 28 wherein constructing further comprises:
determining principal resolution of a principal axis of the bounding box, the principal axis corresponding to a largest side of the bounding box; and
determining remaining resolutions of remaining axes according to the principal resolution.

30. The method of claim 26 wherein reconstructing comprises
de-normalizing the normalized parameterization value using a reference value.

31. The method of claim 26 wherein reconstructing comprises:
determining the intersection point being one of an entry point and an exit point.

32. The method of claim 26 wherein reconstructing comprises:
determining a relative side of the surface with respect to the bounding plane using a sign of the distance.

33. An article of manufacture comprising:
a machine-accessible non-transitory storage medium including data that, when accessed by a machine, cause the machine to perform operations comprising:
constructing a bounding box having a volumetric shape and containing a three-dimensional (3-D) object in a 3-D coordinate system, the bounding box having at least a bounding plane;
projecting a ray from a grid point on the bounding plane to the object with a pre-defined direction, the ray intersecting a surface of the object at an intersection point; and
computing a parameterization value of the intersection point associated with the grid point, the parameterization value corresponding to a distance from the grid point to the intersection point.

34. The article of manufacture of claim 33 wherein the data causing the machine to perform constructing comprise data that, when accessed by the machine, cause the machine to perform operations comprising:
aligning the bounding box with at least one axis of the 3-D coordinate system.

35. The article of manufacture of claim 34 wherein the data causing the machine to perform constructing further comprise data that, when accessed by the machine, cause the machine to perform operations comprising:
determining principal resolution of a principal axis of the bounding box, the principal axis corresponding to a largest side of the bounding box; and
determining remaining resolutions of remaining axes according to the principal resolution.

36. The article of manufacture of claim 33 wherein the data causing the machine to perform projecting comprise data that, when accessed by the machine, cause the machine to perform operations comprising:
projecting the ray to the object at the intersection point being one of an entry point and an exit point.

37. The article of manufacture of claim 36 wherein the data causing the machine to perform computing comprise data that, when accessed by the machine, cause the machine to perform operations comprising:
computing one of an entry value and an exit value corresponding to one of distances from the grid point to the entry point and the exit point, respectively.

38. The article of manufacture of claim 36 wherein the data causing the machine to perform computing comprise data that, when accessed by the machine, cause the machine to perform operations comprising:
computing the distance being a positive value when the surface lies on a first side of the bounding plane and a negative value when the surface lies on a second side of the bounding plane.

39. The article of manufacture of claim 33 wherein the data causing the machine to perform computing comprise data that, when accessed by the machine, cause the machine to perform operations comprising:
normalizing the parameterization value with respect to a reference value.

40. The article of manufacture of claim 33 wherein the data causing the machine to perform projecting comprise data that, when accessed by the machine, cause the machine to perform operations comprising:
projecting the ray to the object intersecting multiple surfaces of the object at multiple intersecting points.

41. The article of manufacture of claim 39 wherein the data further comprise data that, when accessed by the machine, cause the machine to perform operations comprising:
saving the normalized parameterization value.

42. An article of manufacture comprising:
a machine-accessible non-transitory storage medium including data that, when accessed by a machine, cause the machine to perform operations comprising:
retrieving a normalized parameterization value associated with a grid point on a bounding plane of a bounding box having a volumetric shape and containing a three-dimensional (3-D) object in a 3-D coordinate system, the normalized parameterization value corresponding to a distance from the grid point to an object point of the object, the object point being an intersection point between a ray projected from the grid point to a surface of the object with a pre-defined direction; and reconstructing an object point of the object using the normalized parameterization value.

43. The article of manufacture of claim 42 wherein the data causing the machine to perform reconstructing comprise data that, when accessed by the machine, cause the machine to perform operations comprising:

constructing the bounding box.

44. The article of manufacture of claim 43 wherein the data causing the machine to perform constructing the bounding box comprises data that, when accessed by the machine, causes the machine to perform operations comprising:

aligning the bounding box with at least one axis of the 3-D coordinate system.

45. The article of manufacture of claim 44 wherein the data causing the machine to perform constructing further comprise data that, when accessed by the machine, cause the machine to perform operations comprising:

determining principal resolution of a principal axis of the bounding box, the principal axis corresponding to a largest side of the bounding box; and determining remaining resolutions of remaining axes according to the principal resolution.

46. The article of manufacture of claim 42 wherein the data causing the machine to perform reconstructing comprise data that, when accessed by the machine, cause the machine to perform operations comprising:

de-normalizing the normalized parameterization value using a reference value.

47. The article of manufacture of claim 42 wherein the data causing the machine to perform reconstructing comprise data that, when accessed by the machine, cause the machine to perform operations comprising:

determining the intersection point being one of an entry point and an exit point.

48. The article of manufacture of claim 42 wherein the data causing the machine to perform reconstructing comprise data that, when accessed by the machine, cause the machine to perform operations comprising:

determining a relative side of the surface with respect to the bounding plane using a sign of the distance.

* * * * *